United States Patent [19]

Kikuchi et al.

[11] 4,422,733
[45] Dec. 27, 1983

[54] CLADDED SPHERICAL LENS HAVING UNEVEN REFRACTIVE INDEX

[75] Inventors: Keisuke Kikuchi, Ibaragi; Takitaro Morikawa, Sayama; Junichi Shimada, Ibaragi; Kenjiro Sakurai, Tokyo, all of Japan

[73] Assignees: Agency of Industrial Science & Technology; Ministry of International Trade & Industry, both of Tokyo, Japan

[21] Appl. No.: 244,915

[22] Filed: Mar. 18, 1981

[30] Foreign Application Priority Data

Mar. 31, 1980 [JP] Japan ................ 55-42348
Aug. 27, 1980 [JP] Japan ................ 55-118126
Sep. 4, 1980 [JP] Japan ................ 55-122666

[51] Int. Cl.³ .................................... G02B 9/02
[52] U.S. Cl. ......................... 350/413; 350/416
[58] Field of Search ........... 350/413, 411, 416, 96.19, 350/96.25

[56] References Cited

U.S. PATENT DOCUMENTS

| | | | |
|---|---|---|---|
| 2,213,307 | 9/1940 | Elliot | 350/411 |
| 2,273,847 | 2/1942 | Eckel | 350/413 |
| 3,166,623 | 1/1965 | Waidelich | 350/96.25 |
| 4,153,330 | 5/1979 | Tomlinson | 350/96.19 |
| 4,268,112 | 5/1981 | Peterson | 350/413 |
| 4,327,963 | 5/1982 | Khoe et al. | 350/413 |

FOREIGN PATENT DOCUMENTS

| | | | |
|---|---|---|---|
| 600005 | 3/1948 | United Kingdom | 350/416 |
| 664754 | 1/1952 | United Kingdom | 350/416 |

*Primary Examiner*—John K. Corbin
*Assistant Examiner*—Rebecca D. Gass
*Attorney, Agent, or Firm*—Kurt Kelman

[57] ABSTRACT

A cladded lens having an uneven refractive index comprises a spherical core having a graded refractive index and producing negative lateral aberration and a cladding producing positive lateral aberration. The aberrations of the core and the cladding are canceled by each other to be considerably corrected. Such a cladded lens is especially effective for optical communication and optical recording-regenerating as in PCM technology.

5 Claims, 25 Drawing Figures

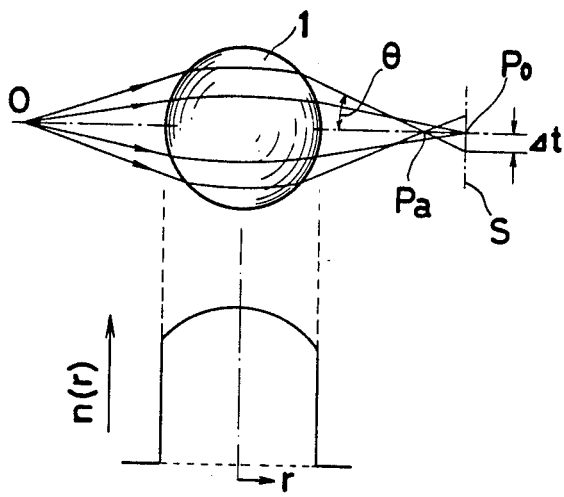
Fig_1(A)
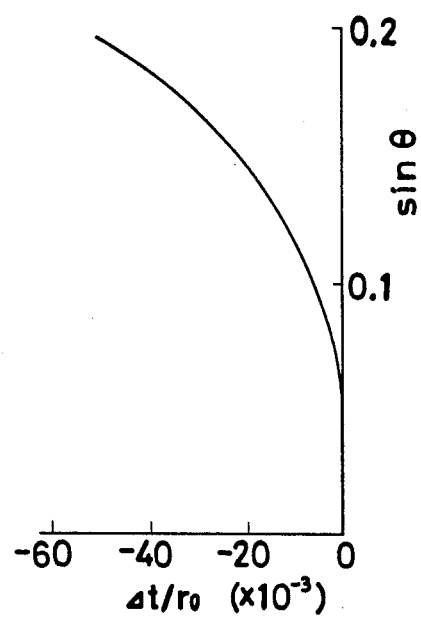
Fig_1(B)
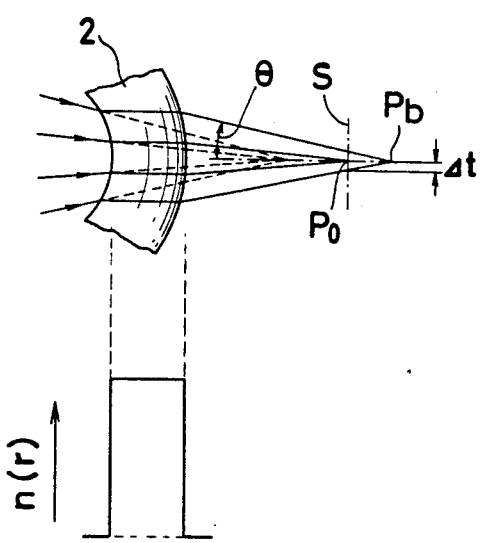
Fig_2(A)
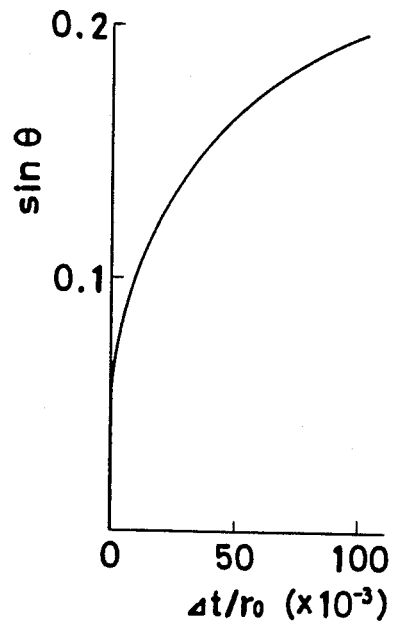
Fig_2(B)

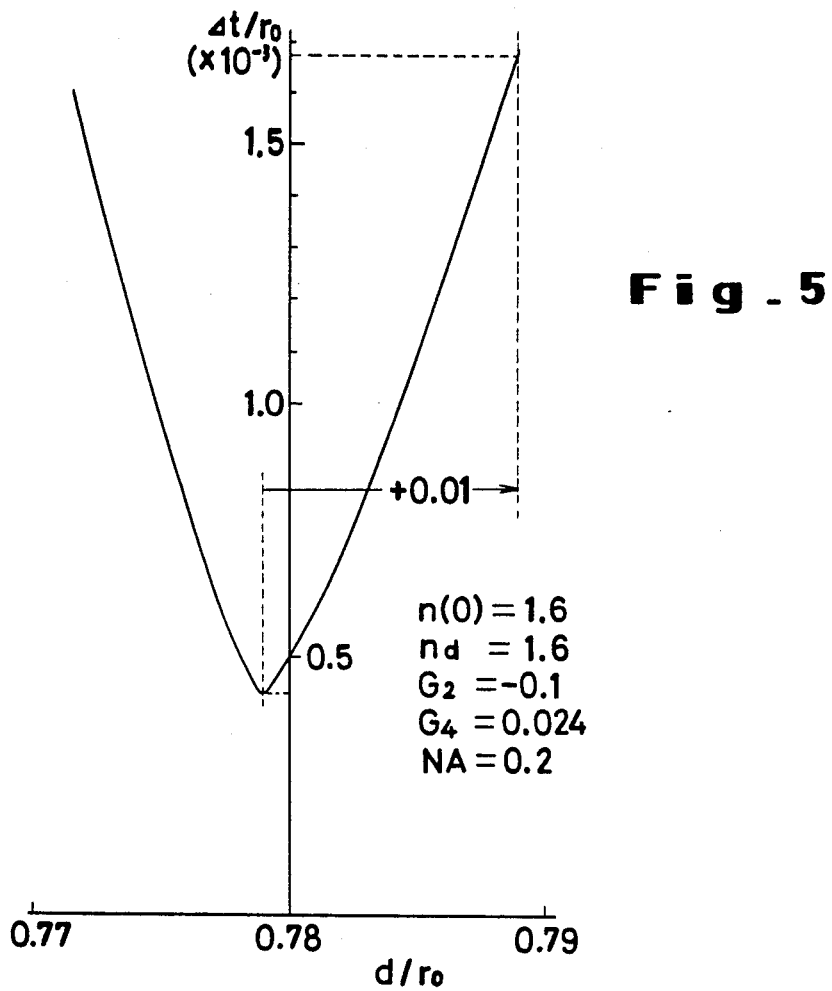
Fig _ 5
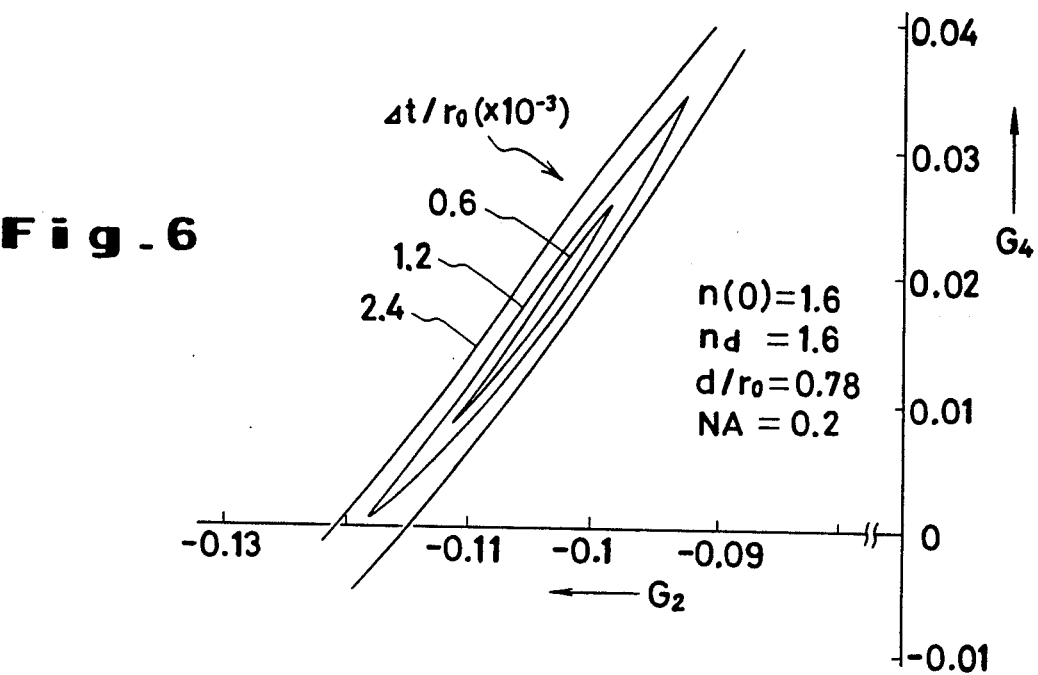
Fig _ 6

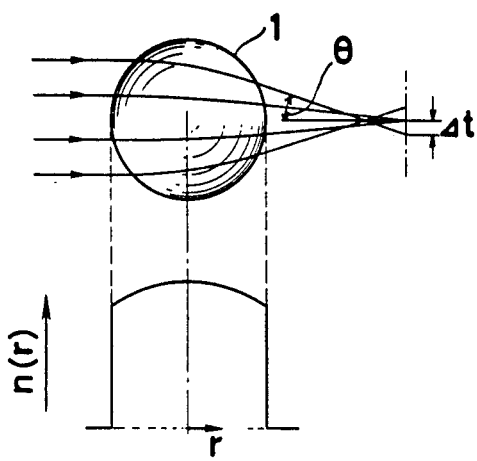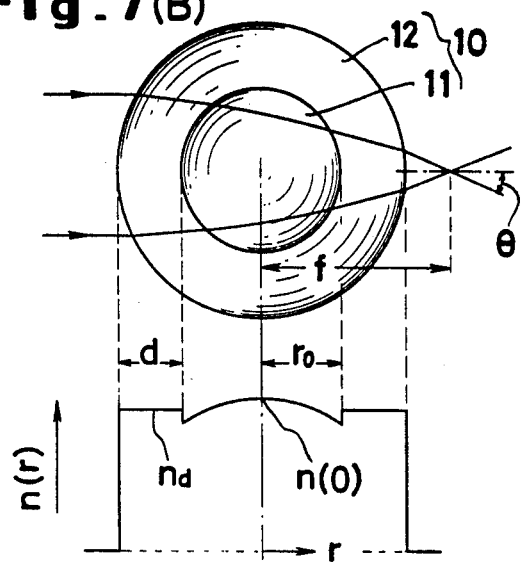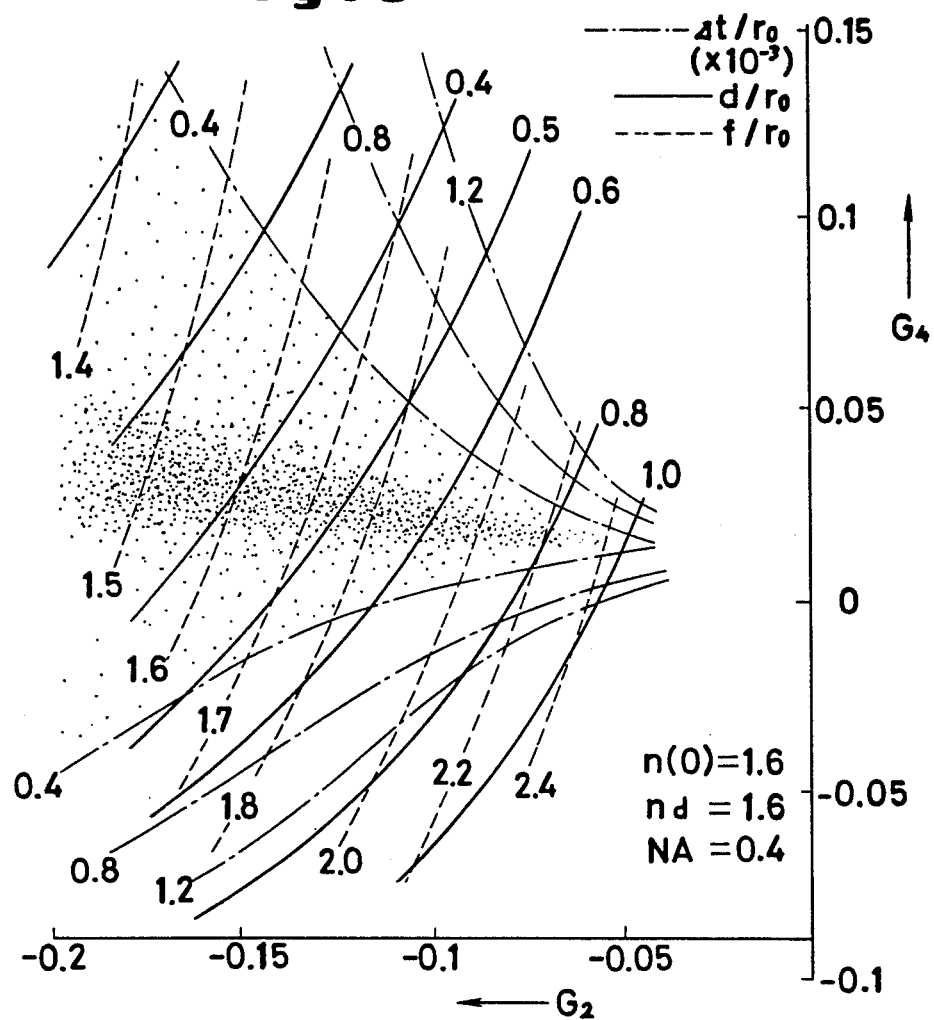

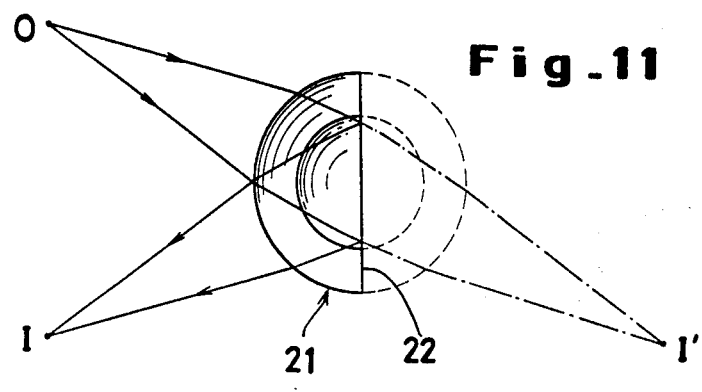
Fig_11
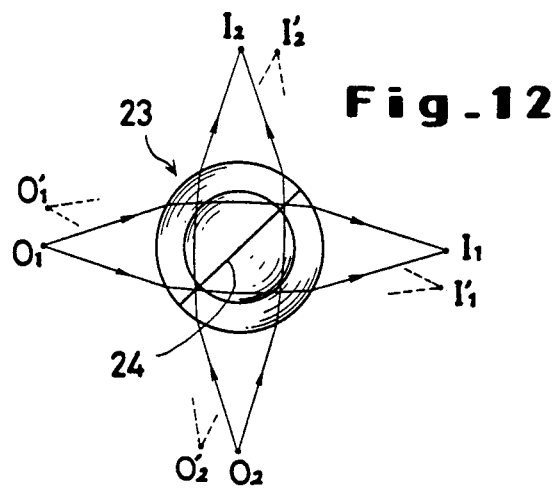
Fig_12
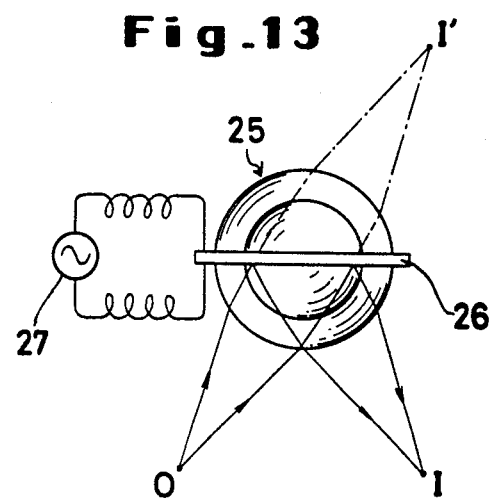
Fig_13
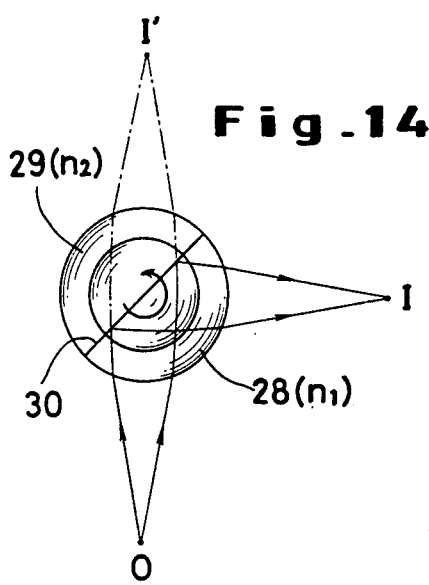
Fig_14
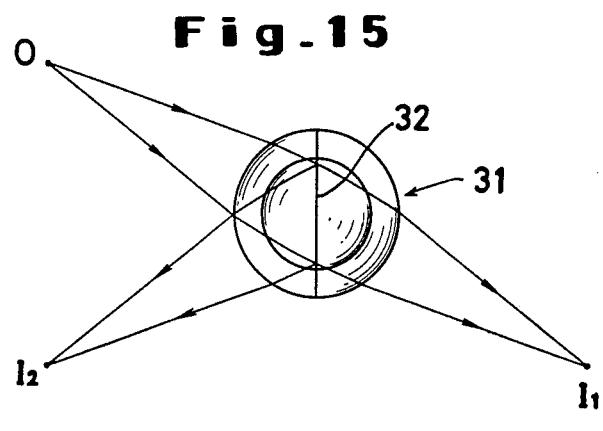
Fig_15

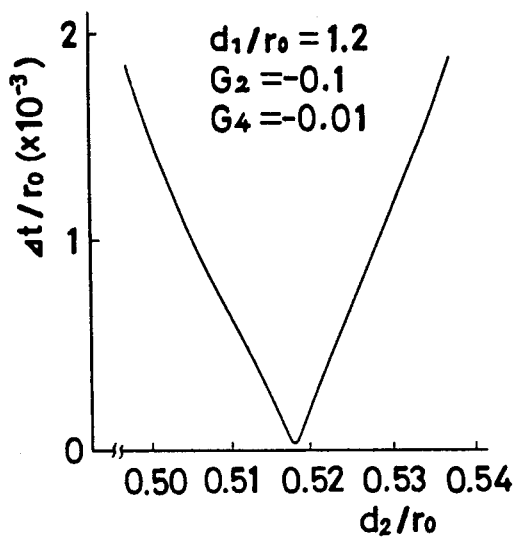
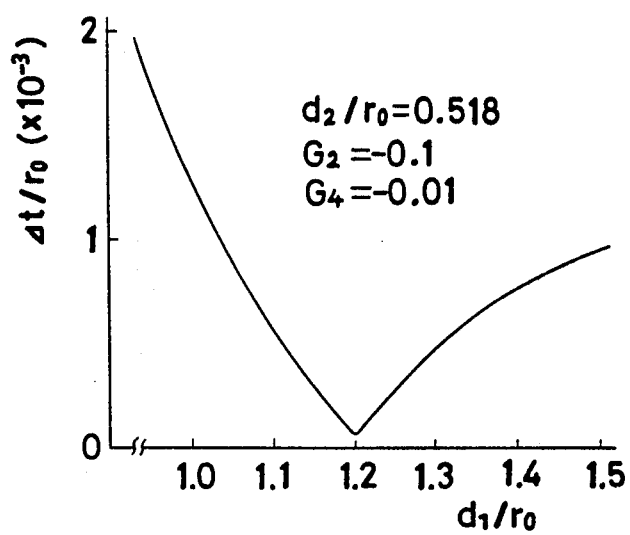
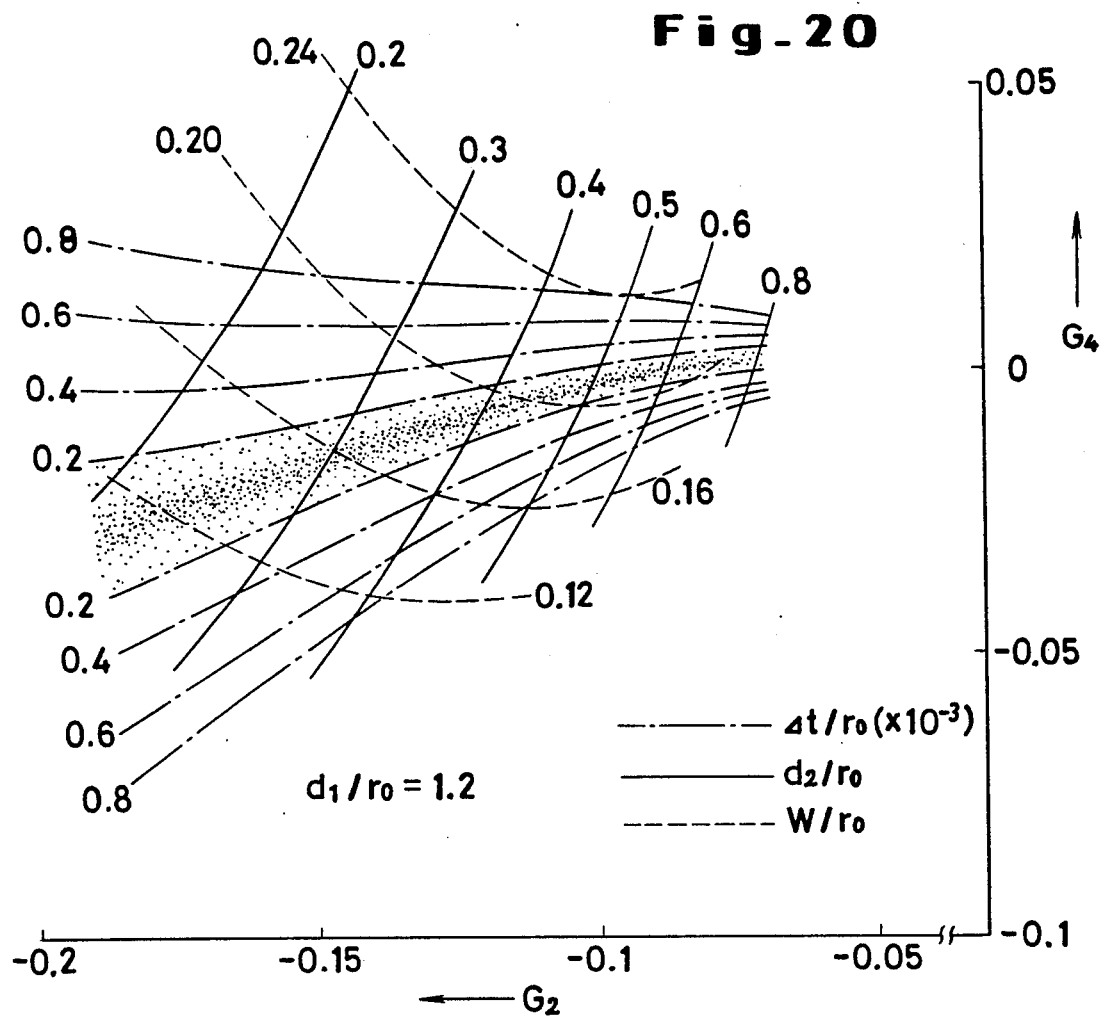

CLADDED SPHERICAL LENS HAVING UNEVEN REFRACTIVE INDEX

BACKGROUND OF THE INVENTION

This invention relates to a spherical lens having an uneven refractive index and a construction capable of correcting spherical aberration.

In optical communication and optical recording-regenerating techniques in the optoelectronics field, which have made remarkable technological progress particularly in recent years, improvements in various apparatuses including luminescent elements, transmission means such as optical fibers, and information processing units, have advanced rapidly, attaining higher performance and reliability that have readied these apparatus for practical use. However, the optical systems constituting one part of such apparatuses are still much indebted to conventional technology and therefore, it is strongly desired to have high performance optical systems in order to allow said main apparatuses to fully exhibit their excellent performance.

For example, when information signals are read out of an optically recorded PCM disk, a light beam is focused on a recording surface on which information is recorded in the form of pits so that the information is read out by detecting changes in the intensity of the light reflected by the recording surface. This type of optical pickup will be miniaturized in line with the trend toward miniaturization of overall systems. Hence it is considered that the focal length of the lens should be made as short as possible, and for this, a spherical lens having a large refractive index is considered useful.

On the other hand, in optical communication it is common to optically connect optical fibers by interposing a spherical lens between them so as to allow beams emitted from one fiber to enter the other fiber through its end surface. Also in this case it is required that the beams emitted from the fiber be accurately focused on the end surface of the other fiber. Further, spherical lenses with short focal lengths are advantageously employed not only in such microelectronics field as image processing and phase-information processing, but also for the optical systems of medical laser scalpels and microcameras.

The spherical lens, however, suffers the disadvantage of having large spherical aberration. This is true not only of spherical lenses having a uniform refractive index throughout but even of those having a refractive index which has been gradually reduced from the center toward the periphery by ion exchange since in the latter case it is not possible to obtain a sharp enough refractive index gradient. As illustrated in FIG. 1(A), the paraxial rays from a point O on the optical axis on one side of a spherical lens having a continuously graded refractive index from the center to the periphery intersect the optical axis at a point Po on the other side of the lens, while emerging rays having a larger exit angle ($\theta$) intersect the optical axis at a point Pa which is nearer to the lens 1 than the point Po. Assuming that the intersection point Po of the paraxial rays with the optical axis is on an image plane S, lateral aberration is represented by the distance $\Delta t$ between the point Po and the intersection point at which the emerging rays having a larger exit angle intersect the image plane S. Usually, as shown in FIG. 1(B), in the spherical lens, the larger the exit angle $\theta$ of the ray is, the larger the lateral aberration $\Delta t$ becomes. This is inevitably true not only of spherical lenses, but also of lenses in general. Even a spherical lens improved by being given a graded refractive index as shown in the graph of FIG. 1(A) still has large aberration because the slope of the refractive index gradient cannot be made large.

Such spherical aberration has been an obstacle to simplification of the optical pickup in optical recording-regenerating apparatuses and to good optical coupling in optical communication.

Spherical lenses of this type having a refractive index graded from the center thereof towards the periphery are known Maxwell fisheye lenses and Luneburg lenses. The Maxwell fisheye lens is capable of focusing a ray of light originating from a given point on the spherical surface at the symmetrically opposite point on the spherical surface but cannot emit a ray of light to the outside of the spherical lens. The latter lens focuses a parallel incident light flux received on one side of the lens at a point on the other side on the spherical surface, but cannot focus the flux outside the spherical lens.

Morgan has proposed an ideal refractive index distribution for a generalized Luneburg lens which would allow a light flux from a point exterior of the lens to be focused at a point on the opposite side of the lens without aberration. However, the technology for producing such a lens has not been developed. Assume that the gradient of refractive index is to be given to the lens by the ion exhange method. While a refractive index which decreases approximately in proportion to the square of the distance from the center can be attained by the ion exchange method, this method cannot produce the ideal refractive index gradient according to Morgan. The refractive index gradient in the Maxwell fisheye lens and the Luneburg lens is so steep as to make production of such lenses even more difficult.

Because of the problems inherent in conventional spherical lenses, there is needed a lens which is simple in construction and easy to produce and which has little aberration and can be easily applied to various apparatuses.

SUMMARY OF THE INVENTION

One object of this invention is to provide a spherical lens with little spherical aberration which is of simple structure and can be used in a wide variety of applications.

In order to achieve the above-mentioned object, the spherical lens according to this invention comprises a spherical core having a continuously varying refractive index gradient and a cladding covering the periphery of this spherical core at least on the sides where the light rays enter and exit.

Since the lateral aberrations caused by the spherical core and the cladding covering the outer surface thereof are of opposite sign, they cancel each other to reduce the overall aberration of the lens. An arbitrary refractive index gradient is given to the spherical core using ion exchange method so that the desired spherical lens can be easily obtained merely by the attachment of the cladding having a thickness determined on the basis of the refractive index gradient of the spherical core. Also the spherical lens thus constituted may be divided into halves so that the divided plane can be used as a reflection plane, to provide the halved lens with functions equivalent to those of a complete spherical lens.

Other objects and features of this invention will be apparent from the following detailed description with reference to the accompanying drawings.

BRIEF EXPLANATION OF THE DRAWINGS

FIGS. 1(A) and 1(B) are respectively a schematic structural diagram and a graph representing the simple spherical lens having a graded refractive index.

FIGS. 2(A) and 2(B) are respectively a schematic structural diagram and a graph representing the aberration characteristics of a spherical lens cladding.

FIGS. 4 through 6 are respectively aberration correcting characteristic graphs of the spherical lens of FIG. 3.

FIG. 7(A) is a schematic diagram explaining the mechanism by which the core of the spherical lens according to this invention produces aberration for parallel incident rays.

FIG. 7(B) is a structural diagram of the second embodiment of the spherical lens according to this invention.

FIGS. 8 through 10 are respectively aberration correcting characteristic graphs of the spherical lens of FIG. 7(B).

FIGS. 11 through 15 show respectively the third, fourth, fifth, sixth and seventh embodiments according to this invention.

FIGS. 18 through 20 are respectively aberration correcting characteristic graphs of the spherical lenses of FIGS. 16 and 17.

DESCRIPTION OF THE PREFERRED EMBODIMENTS

This invention relates to a cladded spherical lens having uneven refractive index and little aberration.

FIG. 1 shows the aberration characteristics of a spherical core 1 of the cladded spherical lens according to this invention, which core has a refractive index gradient as illustrated in FIG. 1(A). The lateral aberration ($\Delta t$) is represented by the distance between the intersection point Po at which paraxial rays ($\theta \approx 0$) cross the optical axis and the intersection point at which emerging rays cross the image plane S perpendicularly passing through the point Po. FIG. 1(B) shows the lateral aberration as a function of the exit angle $\theta$. As apparent from the graph in FIG. 1(B), in the spherical core 1 having the refractive index continuously graded in proportion to the distance r from the center thereof, the larger the exit angle $\theta$ becomes, the shorter the distance between the lens and the intersection point Pa at which the emerging rays cross the optical axis is, thereby to produce negative aberration.

On the other hand, FIG. 2 shows the spherical aberration characteristics of a lens (concave lens) 2 having a pair of concentric curved surfaces and an even refractive index although the index does not have to be even in actual practice. Here, the emerging rays having the exit angle $\theta$ cross the optical axis at a point Pb beyond the point Po at which the paraxial rays cross the optical axis, i.e. the lateral aberration $\Delta t$ measured on the image plane S has a positive sign (FIG. 2(B)) opposite to that of the spherical core 1 in FIG. 1.

Figure 3:
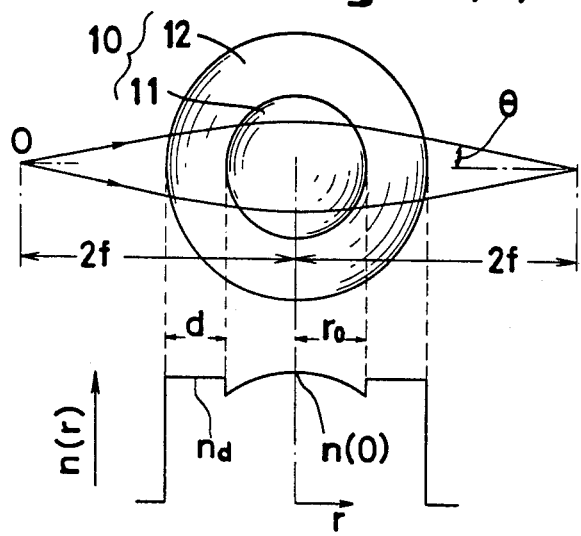
FIGS. 3(A) and 3(B) are respectively a structural diagram and a graph showing the aberration characteristics of the first embodiment of the spherical lens according to this invention.
Figure 3:
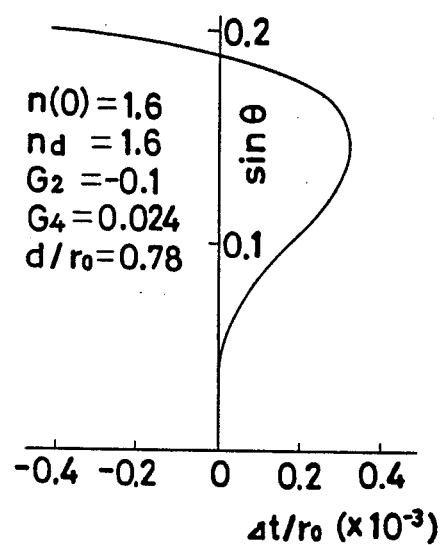

Thus, since the aberration of the spherical core 1 having the graded refractive index shown in FIG. 1 is in the reverse relationship with that of the concave lens 2 shown in FIG. 2, the resultant positive and negative aberrations of the core 1 and the lens 2 are well cancelled by each other to reduce the overall aberration when combined. Hence a spherical lens having small aberration can be constituted from the spherical core having the graded refractive index and said concave lens as a cladding covering the outer periphery of the core. The constitution of this spherical lens 10 is shown in FIG. 3(A) and the distribution of the refractive index n(r) is shown in the lower graph and represented by the following formulas:

$$n^2(r) = n^2(O)[1 + G_2(r/r_o)^2 + G_4(r/r_o)^4]; \ (r < r_o) \quad (1)$$

$$n(r) = n_d; \ (r_o + d > r > r_o) \quad (2)$$

$$n(r) = 1; \ (r > r_o + d) \quad (3)$$

Where, n(O) represents the refractive index at the center of the spherical core 11 having the graded refractive index; r the distance from the center of the spherical core; $r_o$ the radius of the spherical core; $G_2$, $G_4$ the secondary- and fourth-order coefficients representing the distribution of the graded refractive index (equivalent to the curve in the graph of FIG. 3(A)) of the spherical core and $n_d$ the refractive index of cladding 12 which is constant in this case, but which may have a graded refractive index. Also, n(O) and $n_d$ may be arbitrarily determined.

The excellent characteristics of the spherical lens provided with the cladding will be demonstrated numerically. In case of a cladded spherical lens 10 composed of a spherical core 1 mm in radius and a cladding 0.78 mm in thickness, the ratio of the lateral aberration $\Delta t$ to the radius $r_o$ of the core is $0.5 \times 10^{-3}$ when the numeral aperture NA represented by the product of the refractive index of the ambient medium and the sine of the maximum angle ($\sin \theta_{max}$) of the emerging rays crossing the optical axis is 0.2. Thus, the aberration $\Delta t$ shows a marked decrease being about 1/120 of that of the lens in FIG. 1. The reduction of this lateral aberration implies that the aberration can be reduced below the diffraction limit of light, which cannot be attained by any conventional spherical lens.

Figure 4:
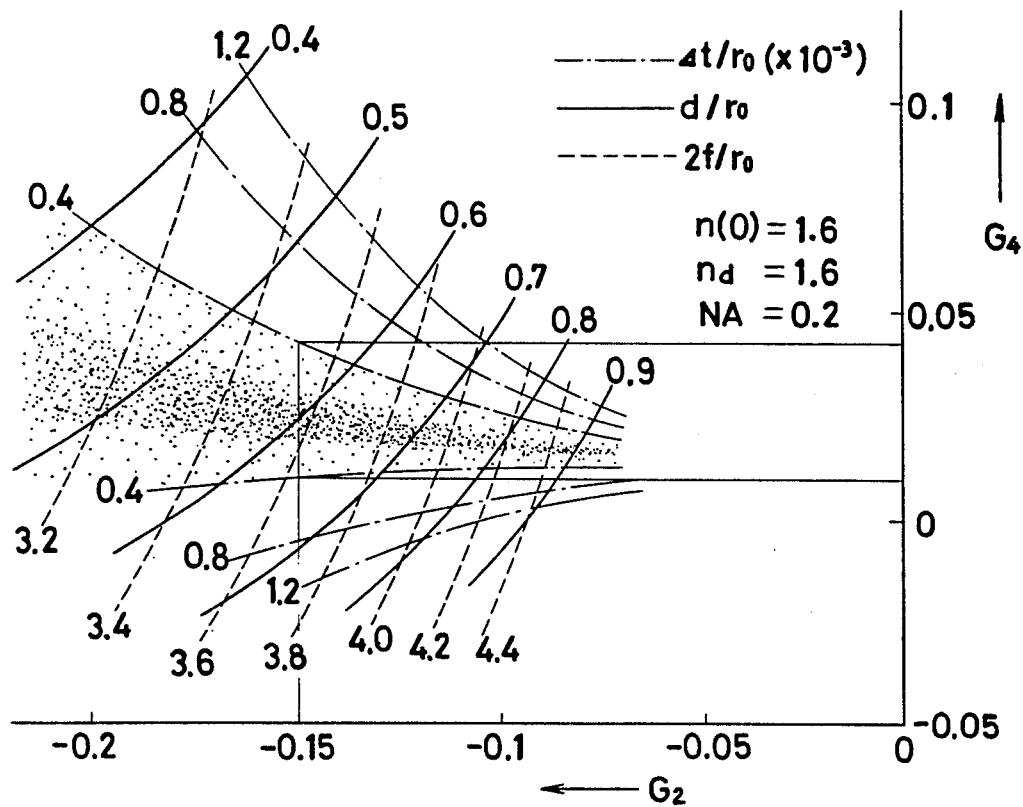

FIG. 4 shows a graph obtained from a calculation on the basis of concrete design data to provide the respective optimum parameters for minimizing the aberration in the cladded spherical lens. Further, the lateral aberration $\Delta t$ is shown in the diagram as the maximum of its absolute values for exit angle $\theta$ from 0 to NA ($\sin \theta_{max}$).

In FIG. 4, for example, when the respective coefficients $G_2$, $G_4$ representing the distribution of refractive index of the spherical core 11 are given, the thickness d of cladding 12 capable of minimizing the lateral aberration, the residual aberration $\Delta t$ and the focal length f of the resultant cladded spherical lens 10 are known by reading out the values of $d/r_o$, $t/r_o$ and $2f/r_o$ at the intersection point of the values of $G_2$ and $G_4$ respectively on the abscissa and ordinate. However, this example is of the configuration shown in FIG. 3(A) in which a light emitting point O and a point at which paraxial rays cross the optical axis are spaced by equal distances from the center of the lens.

The graph also shows the characteristics of the cladding over a range of secondary coefficients ($G_2$) between $-0.07$ and $-0.20$. In this range a graded refractive index can be given to the spherical lens by the ion exchange method or the like with a difference of about 3.5 to 10% between the refractive indexes at the center and the periphery of the core. To put the fourth coefficients $G_4$ within the range of $\Delta t/r_o \lesssim 0.4 \times 10^{-3}$ of small aberration in the graph, it is preferably set to $0.04 > G_4 > 0.01$ with $G_2 = -0.15$, for example. This value range is wide enough to be proper for the lens design since the value of this coefficient changes when the parameters of the optical system (for example, refractive index $n_d$ of the cladding) is changed.

FIG. 5 is a graph showing how much the lateral aberration is enlarged by the inevitable production error in the diameter of spherical core 11 and/or the thickness of cladding 12 during practical production of lenses. For example, referring to the structural requirement in FIG. 3, when the ratio of the thickness d of the cladding to the radius $r_o$ of the spherical core, $d/r_o$, is about 0.779, the aberration is minimized. Assume that $r_o = 1$ mm and the error in the thickness of the cladding is $+0.01$ mm, then the minimum aberration increases from less than 0.5 μm to more than 1.6 μm, i.e., it increases by more than three times with error of only about 1.2%. That is, the tolerance of the thickness of the cladding 12 can be determined from the value of allowable lateral aberration in FIG. 5.

FIG. 6 shows how much the lateral aberration is increased according to the values of the secondary and the fourth coefficients $G_2$, $G_4$ representing the distribution of refractive index of the core, assuming the thickness of the cladding is fixed. This serves to know how much the increase of the lateral aberration can be expected, when $G_2$, $G_4$ entail measuring errors.

Figure 9:
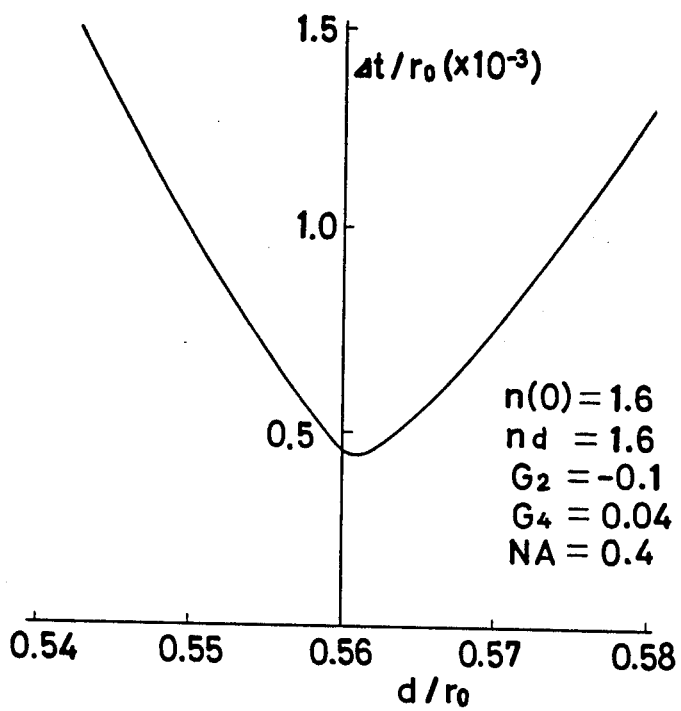
Figure 10:
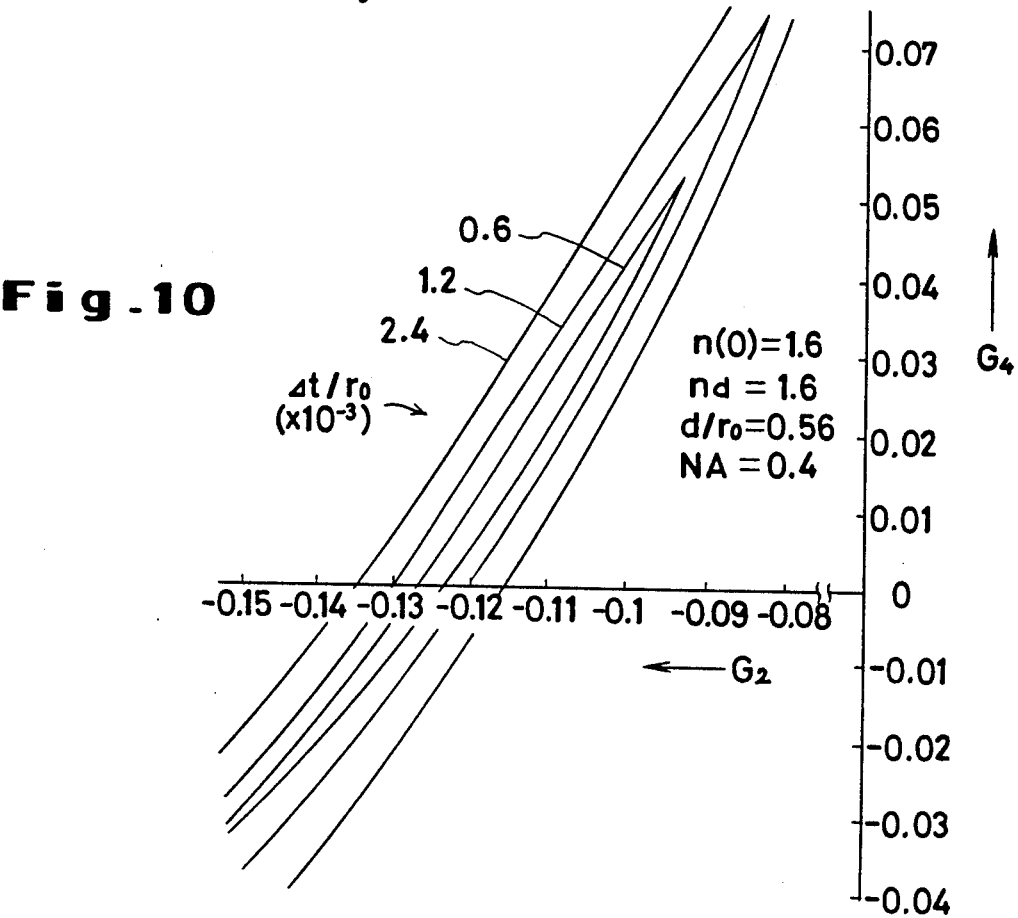

While the characteristics and performance of the cladded spherical lens with the graded refractive index according to this invention have been hereinbefore described to be mainly used for focusing rays of light from a point exterior of lens therethrough on an image plane, this lens can be also utilized as a Fourier transform lens. The function required basically for the Fourier transform lens is to focus parallel incident rays on a point. Thus, in principle, the calculation for the design of said lens for imaging the parallel ray forwarded from an infinite distance to the lens differs little from that in FIG. 3(A). FIG. 7(A) shows the path of the incident rays upon the conventional uncladded spherical lens 1 having a graded refractive index, wherein parallel rays incident upon the lens and emerging from the lens with different exit angles $\theta$ focus at different points on the image plane S, i.e. produce aberration. According to this invention, as apparent from FIG. 8, the aberration can be effectively corrected to a considerable degree by covering the outer periphery of the spherical core 11 with the cladding 12 as shown in FIG. 7(B). FIG. 8 shows the characteristics corresponding to those of the spherical lens for imaging shown in FIG. 4, and shows that the Fourier transform spherical lens can correct the aberration more effectively over a wider range of $G_4$ values. Similarly the allowable range of thickness d of the cladding 12 can be also widened as shown in FIG. 9 to provide the allowable value of $d/r_o$ which is about two times that of the imaging spherical lens shown in FIG. 5. FIG. 10 corresponds to FIG. 6 for the imaging spherical lens and is useful in determining the allowable value of measurement error in the coefficients $G_2$, $G_4$ in the Fourier transform spherical lens. Also, when parallel rays are incident upon the spherical lens, the distance f between the center of the lens and the image plane is shortened considerably compared with that between a light source and the lens.

In the following embodiments, a spherical lens of said structure is divided into halves to constitute a hemispherical lens from one half or both halves combined, which has an effect optically equivalent to said spherical lens.

FIG. 11 shows the one half 21 of said halved spherical lens 10 the section of which is coated with aluminum or the like to provide a reflective surface 22. When rays from a light source O are incident upon the hemispherical lens 21 at a certain angle to this reflective surface 22, the rays are reflected from the reflective surface 22 to focus on a point I. Since this point I is symmetrical about the reflective plane 22 with respect to a point I' on which the spherical lens would focus the rays, the rays reflected from the reflective plane 22 and focused on the point I are equivalent to the rays focused on the point I' by the spherical lens with small lateral aberration. The employment of such constitution contributes to the miniaturization of an optical system and has wide application such as in scanning of the image point I by the rotation of the lens 21 about the reflective plane 22.

FIG. 12 shows a multi-direction spherical lens in which a spherical lens 23 according to this invention is cut into halves and the section 24 is coated with a metal or nonmetal film capable of reflecting half of the rays and transmitting the other half, the two halves being combined such that rays from points $O_1$, $O_2$ are respectively focused on points $I_1$, $I_2$ with small aberration. Simultaneously, rays from points $O_1'$, $O_2'$ can be also treated to focus respectively on points $I_1'$, $I_2'$ with small aberration. This can be applied to multichannel photocouplers in optical communication and Michelson interferometers.

FIG. 13 shows a photoswitch constituted to interpose a transparent photo-modulation film 26 between two halves of a divided spherical lens 25, which film has the electro-optical effect of varying the refractive index when applied with an electric field to focus ray of light from a point O on a point I or I' by signals from a power source 27 with small aberration.

FIG. 14 shows a photoswitch spherical lens in which two hemispherical lenses 28, 29 have respectively different refractive indexes $n_1$, $n_2$, incident rays from one hemispherical lens 28 side being totally reflected from the boundary plane 30 and incident rays from the other hemispherical lens 29 side transmitting through the boundary plane. The rays can be focused selectively on a point I or I' with small aberration by the rotation of this lens. This spherical lens has also various applications and large value for practical use.

FIG. 15 shows a spherical lens having a filter function in which the section 32 of the spherical lens 31 is coated with a filter film for transmitting selectively rays by the wavelength thereof, only the rays of a specific wavelength from a light source O being focused on a point $I_1$ and rays of light of other wavelengths being reflected from the section 32 and focused on a point $I_2$. The spherical lens thus constituted may be provided with a diffraction grating instead of the filter film to focus the rays in different points corresponding to the wavelength.

Thus, the cladded spherical lens can be divided into halves to have a great variety of functions by using one half or combining two halves for wide application.

Further, the next embodiment of said cladded spherical lens is constituted to make the thickness of the cladding on the entry side and that on the exit side different from each other.

Figure 16:
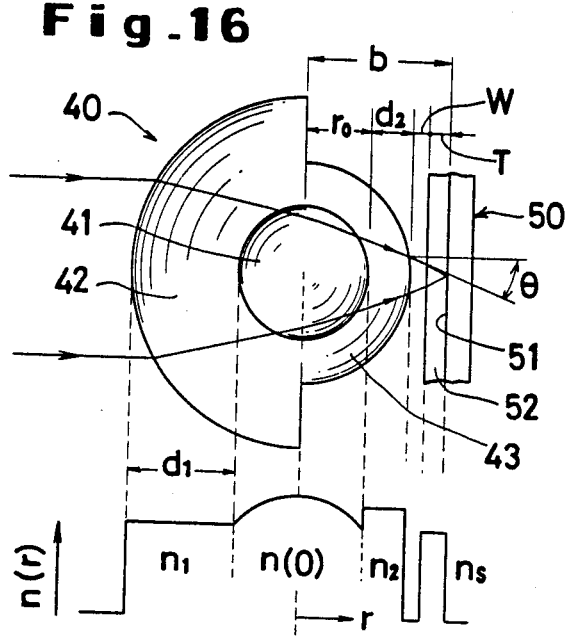
FIG. 16 shows the eighth embodiment of the spherical lens having a cladding of varied thickness according to this invention.

FIG. 16 shows the basic configuration of the spherical lens 40. This embodiment is suitable particularly for a small-size photo-pickup for regenerating information from an optical recording disk. In optical regeneration, a spot of light on the micron order is focused on a pit-recording plane 51 of the disk 50. When parallel rays used generally for optical regeneration technology impinge upon a cladded spherical lens (complete sphere) having a diameter of several millimeters, they are spot-focused at a relatively short distance f, as shown in FIG. 7(B). The focal distance f of such a spherical lens is far shorter than the space W between the spherical lens and disk 50 (working distance) and the thickness T of a transparent protective layer 52 on the disk so that rays of light cannot be spot-focused on the pit-recording surface 51. Thus, as shown in FIG. 16, the rays are adapted for a supersmall-size optical regeneration pickup of the optical recording disk, the thickness $d_2$ of cladding 43 at the exit side is made thinner than that $d_1$ of cladding 42 at the entry side to elongate the imaging distance f.

Figure 17:
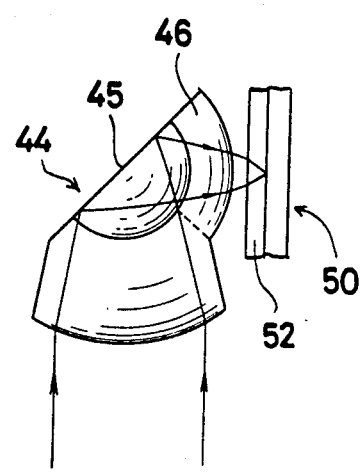
FIG. 17 shows the ninth embodiment according to this invention.

The spherical lens 44 in FIG. 17 is equivalent to that in FIG. 16. The spherical lens in FIG. 16 is divided horizontally into halves, the section 45 being coated with a reflective film or the like. The thickness of a cladding 46 at the exit side is made thinner than the entry side on which the rays of light are incident. The spherical lens 44 thus constructed facilitates the production of a thin optical regeneration pickup.

In either case, the thickness of each cladding has been analytically determined by setting an appropriate NA in the rays extending from 0 to the maximum of the exit angle $\theta$ of the spherical lens to minimize lateral aberration. An example of a configuration for obtaining minimum lateral aberration is as follows:

NA (sin $\theta_{max}$) = 0.45
n(O) (refractive index at the center of core 41) = 1.6
$n_1$ (refractive index in clad 42 at the entry side) = 1.5
$n_2$ (refractive index of clad 43 at the exit side) = 1.6
$n_s$ (refractive index of protective layer 52 on disk) = 1.5
T (thickness of protective layer 52 on disk)/$r_o$ = 0.44
b/a = 0.02 where, a represents the distance between the center of the core 41 and a light source and b the focal distance between the center of the core 41 and the recording surface of the disk.

Figure 18:
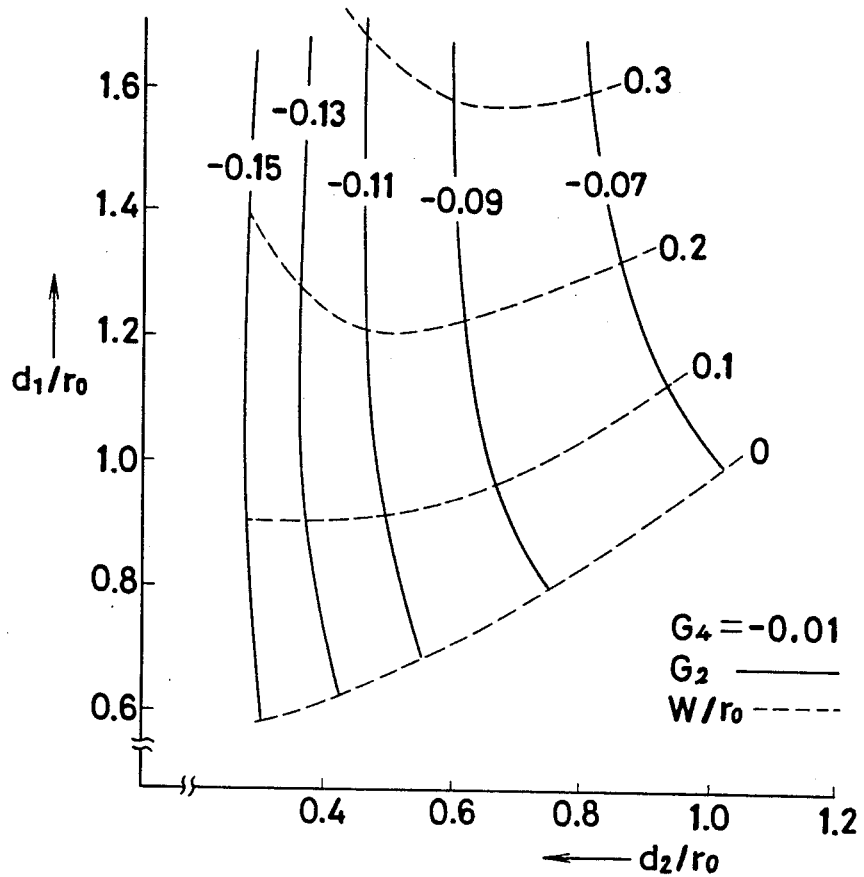

FIG. 18 shows the relationship between the thicknesses $d_1$, $d_2$ of the claddings at the entry and exit sides in relation to the secondary coefficient $G_2$ when the aberration is corrected. As apparent from this drawing, the larger $|G_2|$ on the negative side is, the thinner the cladding of the exit side can be made, while the cladding of the entry side needs the thickness of $d_1/r_o \approx 1$ or more to maintain the space W between the lens and the disk larger than zero. FIG. 19(A) shows the increase in aberration when the thickness $d_1$ of the cladding on the entry side is kept constant and $d_2$ on the exit side is varied. FIG. 19(B) shows the case when the thickness $d_2$ of the cladding on the exit side is kept constant. As is understood from both drawings, the increase in aberration caused by the variation of the thickness of the cladding on the entry side is fairly small compared with that on the exit side and the allowable error in the thickness of the cladding on the entry side is large. Hence, it is more advantageous to design and produce the exit side first and then design and produce entry side after measurement of the exit side.

FIG. 20 shows the ratio $d_2/r_o$ (in the case of $d_1/r_o = 1.2$) of the cladding on the exit side to the diameter of the core, the residual lateral aberration $\Delta t$ and the ratio $W/r_o$ of the space between the disk and the lens to the diameter of the core necessary for compensating for the aberration when the distribution coefficients $G_2$, $G_4$ of the refractive index of the core are given. The range of the distribution coefficients $G_2$, $G_4$ for minimizing aberration can be derived. For example, when the radius $r_o$ of the core is 2.5 mm in the range of $\Delta t/r_o \lesssim 0.2 \times 10^{-3}$ in the drawing, the lateral aberration $\Delta t$ is shown to be as small as $\lesssim 0.5$ μm which is within the diffraction limit.

As described hereinbefore, a degree of correction of aberration higher than has been possible heretofore can be attained with the cladded spherical lens having a graded refractive index according to this invention and the cladded spherical lens can function as a high resolution lens for image formation and Fourier transform. The production of this lens can be very easily carried out by controlling the refractive index gradient according to the well known ion exchange method.

Further, this lens provides excellent features, possesses various functions, and, in particular, makes a contribution to weight reduction and miniaturization when the spherical lens of the basic constitution according to this invention is divided into halves which can be used separately or in combination when combined through a suitable means.

Hence, the cladded spherical lens having the graded refractive index according to this invention has wide applications as a relay lens for projected images, a high-efficiency lens for transmitting rays from a plurality of light sources to a plurality of guide paths (such as optical fibers), a lens for an optical pickup, a Fourier transform lens for processing optical information, a lens for a three dimentional photo-switch network, a lens for high density light energy trnsmitting network, an element lens for use at the flexible portions and the end of a laser scalpel, etc.

What is claimed is:

1. A cladded lens having an uneven refractive index, comprising:
   (a) a core having a radius ($r_o$) and a refractive index (n(r)) continuously graded in proportion to the distance (r) from the center thereof according to the formula:

$$n^2(r) = n^2(o)[1 + G_2(r/r_o)^2 + G_4(r/r_o)^4]$$

where n(o) is the refractive index at the center of the core, and $G_2$ and $G_4$ the secondary- and fourth-order coefficients representing the distribution of the graded refractive index of the core; and
   (b) a cladding covering at least a portion of the outer periphery of said core and having a thickness and a refractive index which are determined in accordance with the refractive index at the center of said core, whereby the aberration can be reduced below the diffraction limit of light.

2. The cladded lens of claim 1, wherein said cladding has an entry side and an exit side and wherein the thickness of said cladding at its entry and exit sides are different.

3. The cladded lens of claim 1, wherein said cladding has an entry side and an exit side and wherein the refractive index of said cladding at its entry and exit sides are different.

4. The cladded lens of claim 1, wherein said cladding has an entry side and an exit side and wherein the thickness and the refractive index of said cladding at its entry and exit sides are different.

5. The cladded lens of claim 1, wherein said core is a hemisphere having a plane portion which is provided with a reflecting means.

* * * * *